US008870436B2

(12) United States Patent
Meis et al.

(10) Patent No.: US 8,870,436 B2
(45) Date of Patent: Oct. 28, 2014

(54) PATTERNED ADHESIVES FOR REFLECTORS

(75) Inventors: Michael A. Meis, Stillwater, MN (US); Audrey A. Sherman, Saint Paul, MN (US); Mieczyslaw H. Mazurek, Roseville, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 12/547,576

(22) Filed: Aug. 26, 2009

(65) Prior Publication Data
US 2010/0067257 A1 Mar. 18, 2010

(51) Int. Cl.
F21V 7/04 (2006.01)
G02B 5/08 (2006.01)
F21V 8/00 (2006.01)
G02F 1/1335 (2006.01)
G02B 5/02 (2006.01)

(52) U.S. Cl.
CPC ........ G02B 5/0841 (2013.01); *G02F 1/133615* (2013.01); *G02F 2202/28* (2013.01); *G02F 2202/36* (2013.01); G02B 6/0055 (2013.01); *G02B 5/02* (2013.01); G02B 6/0031 (2013.01); *G02F 2203/02* (2013.01)
USPC ............................ 362/624; 362/618; 362/627

(58) Field of Classification Search
USPC .......................................... 362/584, 600–634
See application file for complete search history.

(56) References Cited

U.S. PATENT DOCUMENTS

| 5,486,949 A | 1/1996 | Schrenk et al. |
| 5,591,527 A | 1/1997 | Lu |
| 5,612,820 A | 3/1997 | Schrenk et al. |
| 5,650,215 A | 7/1997 | Mazurek et al. |
| 5,783,120 A | 7/1998 | Ouderkirk et al. |
| 5,825,543 A | 10/1998 | Ouderkirk et al. |
| 5,882,774 A | 3/1999 | Jonza et al. |
| 6,123,890 A | 9/2000 | Mazurek et al. |
| 6,208,466 B1 | 3/2001 | Liu et al. |
| 6,315,851 B1 | 11/2001 | Mazurek et al. |

(Continued)

FOREIGN PATENT DOCUMENTS

| DE | 19726644 | 6/1997 |
| JP | 55-120001 | 9/1980 |

(Continued)

OTHER PUBLICATIONS

U.S. Appl. No. 60/986,298 entitled, "Optical Adhesive with Diffusive Properties" filed Nov. 8, 2007.

*Primary Examiner* — Jong-Suk (James) Lee
*Assistant Examiner* — Bryon T Gyllstrom
(74) *Attorney, Agent, or Firm* — Yen T. Florczak

(57) ABSTRACT

A reflector laminate, and backlights and displays incorporating such reflector laminates are disclosed. The reflector laminate includes a substrate and a reflector that are adhered together by a plurality of adhesive protrusions. The adhesive protrusions provide for a plurality of voids between the reflector and the substrate, so that a free reflector surface is adjacent to an air gap between the reflector and substrate. The reflector can include a multilayer interference reflector, and the presence of the air gap ensures high reflectivity for the laminate. The reflector can be adhered to a solid lightguide, a frame enclosing a portion of a backlight, a frame enclosing a hollow lightguide cavity, or an optical sheet positioned at the output surface of a backlight.

7 Claims, 3 Drawing Sheets

(56) References Cited

U.S. PATENT DOCUMENTS

| | | | |
|---|---|---|---|
| 6,440,880 B2 | 8/2002 | Mazurek et al. | |
| 6,444,305 B2 | 9/2002 | Banovetz et al. | |
| 6,447,135 B1 * | 9/2002 | Wortman et al. | 362/623 |
| 6,547,428 B1 | 4/2003 | Delattre | |
| 6,590,707 B1 | 7/2003 | Weber | |
| 6,845,212 B2 | 1/2005 | Gardiner et al. | |
| 6,894,821 B2 * | 5/2005 | Kotchick | 359/246 |
| 6,905,220 B2 | 6/2005 | Wortman et al. | |
| 6,917,473 B2 | 7/2005 | Umemoto et al. | |
| 7,004,610 B2 | 2/2006 | Yamashita et al. | |
| 7,010,212 B2 | 3/2006 | Emmons et al. | |
| 7,223,005 B2 * | 5/2007 | Lamb et al. | 362/615 |
| 7,250,210 B2 | 7/2007 | Mazurek et al. | |
| 7,253,809 B2 | 8/2007 | Boyd et al. | |
| 7,278,775 B2 | 10/2007 | Yeo et al. | |
| 7,321,464 B2 | 1/2008 | Ouderkirk et al. | |
| 7,357,555 B2 | 4/2008 | Ouderkirk et al. | |
| 7,407,313 B2 * | 8/2008 | Schardt et al. | 362/609 |
| 7,852,560 B2 * | 12/2010 | Ouderkirk et al. | 359/489.08 |
| 2004/0022050 A1 * | 2/2004 | Yamashita et al. | 362/31 |
| 2004/0105157 A1 * | 6/2004 | Matsushita et al. | 359/584 |
| 2006/0077555 A1 * | 4/2006 | Chen et al. | 359/599 |
| 2007/0054133 A1 | 3/2007 | Sherman et al. | |
| 2007/0058390 A1 * | 3/2007 | Sugawara et al. | 362/560 |
| 2007/0153543 A1 | 7/2007 | Xu et al. | |
| 2007/0236960 A1 * | 10/2007 | Anderson et al. | 362/627 |
| 2007/0279935 A1 | 12/2007 | Gardiner et al. | |
| 2008/0037127 A1 | 2/2008 | Weber | |
| 2008/0043490 A1 | 2/2008 | Coleman et al. | |
| 2008/0064115 A1 | 3/2008 | Hiramatsu | |
| 2008/0064133 A1 | 3/2008 | Lee et al. | |
| 2011/0037927 A1 * | 2/2011 | Hara et al. | 349/67 |

FOREIGN PATENT DOCUMENTS

| | | |
|---|---|---|
| JP | 55-120002 | 9/1980 |
| JP | 06-342106 | 12/1994 |
| JP | 11-224519 | 8/1999 |

* cited by examiner

PATTERNED ADHESIVES FOR REFLECTORS

CROSS REFERENCE TO RELATED APPLICATION

This application claims the benefit of U.S. Provisional Patent Application No. 61/097,724, filed Sep. 17, 2008, the disclosure of which is incorporated by reference herein in its entirety.

BACKGROUND

Optical displays, such as liquid crystal displays (LCDs), are becoming increasingly commonplace, finding use for example in mobile telephones, portable computer devices ranging from hand held personal digital assistants (PDAs) to laptop computers, portable digital music players, LCD desktop computer monitors, and LCD televisions. In addition to becoming more prevalent, LCDs are becoming thinner as the manufacturers of electronic devices incorporating LCDs strive for smaller package sizes.

Many LCDs use a backlight for illuminating the LCD's display area. The backlight can include a solid lightguide in the form of a slab or wedge. The solid lightguide is often made of an optically transparent polymeric material produced by, for example, injection molding. Many solid lightguides also include a reflector that is used to more efficiently utilize light that may exit the bottom surface of the solid lightguide. The backlight can instead include a hollow cavity lightguide which has reflective surfaces surrounding the interior of a hollow cavity. The output surface of the hollow cavity lightguide is often a partially transmissive surface.

In many applications, the backlight includes one or more light sources that optically couple light into the lightguide from one or more edges of the lightguide. The optically coupled light typically travels through a solid lightguide by total internal reflection (TIR) from the top and bottom surfaces. The optically coupled light travels through the hollow cavity lightguide by reflection from reflective surfaces. Eventually, the light encounters some feature that causes a portion of the light to exit the lightguide through an output surface. The feature can be an extraction surface that re-directs light through the output surface, or the output surface can be a partial reflector that allows a portion of the light to leak from the lightguide with each reflection.

Backlight reflectors used in both solid and hollow cavity lightguides need to have a high reflectivity for efficient transport of light. An efficient reflector is a multilayer interference reflector available from 3M Company under the trade designation Vikuiti ESR™ (Enhanced Specular Reflective) film. High reflectivity is achieved using a suspended ESR film that has a low index material (typically an air gap) adjacent to each surface of the film. There is a need for a method to secure highly reflective interference reflector films to surfaces, while maintaining the air gap adjacent to each side of the film.

SUMMARY

Generally, the present disclosure relates to reflective laminates. The present disclosure also relates to displays, and backlights for displays, that use the reflective laminates. The reflective laminates include adhesive protrusions that provide an air gap adjacent the reflector.

In one aspect of the disclosure, a reflective laminate includes a substrate, an optically thick adhesive layer in contact with a first surface of the substrate, and an interference reflector having a second surface disposed facing the first surface of the substrate. The optically thick adhesive layer includes a plurality of protrusions. The plurality of protrusions is in contact with a portion of the second surface of the interference reflector. A void is defined between the second surface of the interference reflector, the protrusions, and the first surface of the substrate.

In one embodiment, the portion of the second surface of the interference reflector in contact with the protrusions can be less than 10%, or less than 5%, or less than 1% of the second surface. In another embodiment, the refractive index of the optically thick adhesive layer can be less than a lowest refractive index of the interference reflector over a wavelength range of interest. In one embodiment, the optically thick adhesive layer in contact with the first surface of the substrate can be a continuous layer or a discontinuous layer, and the discontinuous layer can be uniformly discontinuous. In one embodiment, the protrusions can include a plurality of ridges or a plurality of islands, or a combination of ridges and islands. In one embodiment, the optically thick adhesive layer includes a plurality of particles. In one embodiment, the substrate includes a diffuser.

In one aspect of the reflective laminate, the substrate is a diffuser, the interference reflector includes a third surface opposite the second surface, and the reflective laminate further includes a second optically thick adhesive layer in contact with the third surface of the interference reflector. A second substrate having a fourth surface is in contact with the second optically thick adhesive layer. In one embodiment, the second optically thick adhesive layer includes a second plurality of protrusions projecting from the fourth surface of the second substrate. In one embodiment, the second optically thick adhesive layer includes a second plurality of ridges. In one embodiment, the second substrate includes an optically transparent plate. In another embodiment, the second substrate comprises a diffuser.

In another aspect, a backlight assembly includes a reflective laminate, an output element, and a light source. The reflective laminate includes a substrate, an optically thick adhesive layer in contact with a first surface of the substrate, and an interference reflector having a second surface disposed facing the first surface of the substrate. The optically thick adhesive layer includes a plurality of protrusions. The plurality of protrusions is in contact with a first portion of the second surface of the interference reflector. A second portion of the second surface is a free surface adjacent an optically thick void. The output element is disposed facing the interference reflector, defining a cavity between the output element and the interference reflector, and the light source is capable of injecting light into the cavity. In one embodiment, the ratio of the second portion of the second surface to the first portion of the second surface is greater than 10. In another embodiment, the output element includes a partial reflector. In yet another embodiment, the partial reflector is an Asymmetric Reflective Film. In one embodiment of the backlight assembly, the partial reflector has an input surface and an output surface opposite the input surface, and the output element further includes an optically transparent plate, a third optically thick adhesive layer, and a diffuser. The optically transparent plate is adhered to the output surface of the partial reflector with a second optically thick adhesive layer. The third optically thick adhesive layer is in contact with the input surface, and includes a second plurality of protrusions projecting from the input surface. The diffuser is in contact with the second plurality of protrusions, and faces the interference reflector.

These and other aspects of the present application will be apparent from the detailed description below. In no event, however, should the above summaries be construed as limitations of the claimed subject matter, which subject matter is defined solely by the attached claims and their equivalents, as may be amended during prosecution.

BRIEF DESCRIPTION OF THE DRAWINGS

Throughout the specification reference is made to the appended drawings, where like reference numerals designate like or similar elements, and wherein.

The figures are not necessarily to scale. Like numbers used in the figures refer to like or similar components. However, it will be understood that the use of a number to refer to a component in a given figure is not intended to limit the component in another figure labeled with the same number.

DETAILED DESCRIPTION

Figure 1:
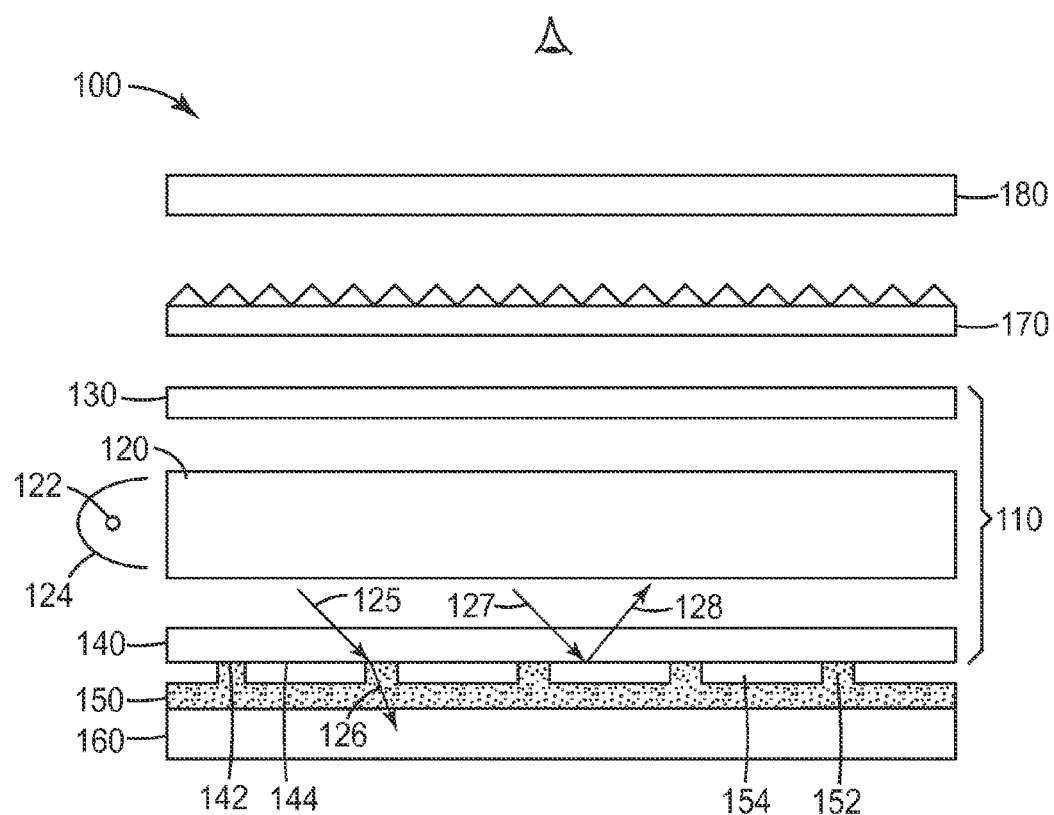
FIG. 1 is a schematic view of a backlit display.

The present description discloses a reflective laminate that can be used to reduce optical losses from a reflector in a display. The optical losses are reduced by laminating the reflector to a substrate member with an optically thick adhesive that includes protrusions to maintain a separation between the reflector and the substrate. The substrate member can be a solid lightguide, a frame enclosing a portion of a backlight, a frame enclosing a hollow lightguide cavity, or an optical sheet positioned at the output surface of a backlight. The reflector can be a high efficiency reflector, a partially transmissive reflector, or a diffuse reflector. For a partially transmissive reflector, the substrate member can be positioned at the output surface of a backlight.

For purposes of this disclosure, "optically thick" materials refer to a material thickness that is generally greater than the wavelength of light, preferably orders of magnitude greater, for example at least 1 micrometer, and possibly hundreds of micrometers or more. Geometrical optics can sufficiently predict or describe optical properties of an optically thick film, such as its reflective and transmissive properties. In contrast, interference optics can be used to sufficiently describe the behavior of light traveling in interference films, such as the thin film layers in multilayer interference reflectors.

The optically thick adhesive includes a plurality of protrusions which contact the reflector in a first portion of the reflector surface area. The plurality of protrusions contacting the reflector can be continuous across the surface of the reflector, for example a series of ridges or crossed ridges. The plurality of protrusions can instead be discontinuous, for example an array of dots or islands of adhesive. The array of protrusions can be a regular array, or the protrusions can be randomly dispersed over the reflector surface. The protrusions are preferably uniformly dispersed over the entire reflector surface, so that the reflector can be firmly attached to the substrate. The optically thick adhesive can be, for example, a dry-film hot melt adhesive, a dry-film pressure sensitive adhesive, a radiation curable adhesive, or a solvent based adhesive.

The adhesive protrusions can be deposited by selective transfer, screen printing, ink jet printing, or any other patterning techniques. The adhesive protrusions can be small, widely spaced dots, lines or areas of adhesive. In one aspect, the refractive index and the pattern of the adhesive can be adjusted to control the reflectivity versus optical coupling through the contact point, as described elsewhere. In another aspect, it may be desirable to add diffusing particles to scatter some light in the lightguide into a wide range of angles for extraction, while still providing a reflector for recycling light. In another aspect, it may be desirable to scatter some light into a random range of angles for extraction from the lightguide, and also diffusely reflect recycled light in the lightguide. In one aspect, a diffuse reflector adhered to a lightguide by small adhesive dots can produce a combination of randomly scattered light for extraction and diffusely reflected light for recycling.

Contact of the first portion of the reflector with the protrusions provides a second portion of the reflector which is in contact with air, and inadvertent contact of the second portion with any higher refractive index material is prevented. Inadvertent contact can cause undesired light transmission through the reflector (light leakage) in the region of contact. Selection of an optical adhesive with an appropriate refractive index can reduce or eliminate even the undesired light transmission through the adhesive protrusions that contact the interference reflector.

Many optical products and devices that require a high reflectivity mirror use a thin film interference stack for that purpose. Such thin film interference reflectors can be made economically, and can be designed to provide high reflectivity over a desired wavelength band, such as the human visible wavelength spectrum, the output spectrum of a specified light source, or the sensitivity spectrum of a specified detector. The interference reflectors can also provide reflectivity over a range of angles of the incident light. Excellent reflectivity can usually be achieved—at a particular wavelength, or even over the entire wavelength range of interest—for normally incident light and for moderate angles of incidence. This performance is usually adequate for the intended end-use application. Examples of interference reflectors, such as multilayer interference reflectors, include those described in U.S. Pat. No. 6,208,466 (Liu et al.); U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and U.S. Pat. No. 5,486,949 (Shrenk et al.). In some cases, wide angle mirror systems or broadband mirrors can be used to improve the reflectivity over a broad range of wavelengths and angles, as described for example in U.S. Patent Publication No. US2008/0037127 (Weber), entitled "Wide Angle Mirror System".

For some applications, a birefringent multilayer stack adapted to reflect visible light can be used to reflect and distribute some of the light that is injected into the edge of a lightguide within a backlight. One such birefringent multilayer stack is a multilayer interference reflector available from 3M Company under the trade designation Vikuiti ESR™ (Enhanced Specular Reflective) film. Acceptable performance of such backlights is achieved by suspending the ESR film below a solid lightguide such that the ESR film is immersed in a very low refractive index medium such as air, for optimal performance. However, optical losses can arise if the ESR film ceases to be immersed in the low refractive index medium, for example, if the ESR film comes in contact with the solid lightguide or another portion of the display, particularly if this occurs on both sides of the ESR film simultaneously.

According to one aspect of the disclosure, an interference reflector such as an ESR film can be laminated to a lightguide using an optically thick adhesive having an array of protrusions that maintain a separation (air gap) over a portion of the ESR. According to another aspect of the disclosure, an interference reflector such as an ESR film can be laminated to a substrate adjacent a lightguide, such as a back frame of the backlight, using an optically thick adhesive having an array of protrusions that maintain a separation (air gap) over a portion of the ESR.

In one embodiment, the optically thick adhesive can have an index of refraction less than the lowest refractive index of the ESR film. The refractive index difference can be chosen such that substantially all injected light remains in the lightguide. In another embodiment, light recycled back into the lightguide from light management films disposed between the lightguide and display can be incident on the ESR film, causing it to reflect back towards the display. Various light management films are known, and include prism films such as Vikuiti™ Brightness Enhancement Film "BEF" or Thin Brightness Enhancement Film "TBEF", and reflective polarizer film such as Vikuiti™ Dual Brightness Enhancement Film "DBEF", available from 3M Company The lightguide can be of any desired size or shape, and can be of uniform thickness such as a slab, or tapered such as a wedge. The lightguide can, for example, be suitable for use in a backlight for a liquid crystal display (LCD) in a mobile phone, laptop computer, television, or other application. Extraction features can be provided on a front surface or elsewhere on or in the lightguide, to direct light out of the lightguide towards a liquid crystal panel or other component to be illuminated.

The lightguide can include extraction features on the side opposite of the laminated reflector, causing light to be directed toward the viewer at predetermined angles. Examples of extraction features can be found, for example, in U.S. Pat. No. 6,845,212 (Gardiner et al.) and U.S. Pat. No. 7,223,005 (Lamb et al.); and also in U.S. Patent Publication No. 2007/0279935 (Gardiner et al.). The extraction features can be grooves, lenslets, or other microstructured features designed to extract light from the lightguide. The extraction features can be imparted to the lightguide using several methods, including but not limited to: casting, embossing, microreplicating, printing, ablating, etching and other methods known in the art.

The present disclosure also provides a lightguide and a reflector as a single unit, such as a lightguide laminate, reducing the backlight part count and cost to a backlight assembler. Lamination of the lightguide to the reflector prevents debris, which can cause defects in display uniformity, from entering between the two surfaces. Appropriate selection of lightguide and adhesive protrusion refractive indices can preserve light-guiding and prevent light from entering the reflector at an angle greater than the leak angle. The lamination of the two components may also reduce warp of the individual components, resulting in improved environmental performance and stability.

In another aspect of the disclosure, the backlight design can be a hollow cavity lightguide having a recycling optical cavity. In a hollow cavity lightguide, a large proportion of the light undergoes multiple reflections between substantially coextensive front and back reflectors before emerging from the front reflector. The front reflector is partially transmissive and partially reflective. Overall losses for light propagating in the recycling cavity are kept extraordinarily low, for example, both by providing a substantially enclosed cavity of low absorptive loss, including low loss front and back reflectors as well as side reflectors. The reflectors in a hollow cavity lightguide are typically laminated to the interior surfaces of the lightguide. The adhesive protrusions of the present disclosure contribute to providing low loss reflectors by maintaining air contact with a substantial portion of the surface of the reflectors.

In the case of a backlight designed to emit only light in a particular (useable) polarization state, the front reflector can have a high enough reflectivity for such useable light to support lateral transport or spreading, and for light ray angle randomization to achieve acceptable spatial uniformity of the backlight output, but a high enough transmission into the appropriate application-useable angles to ensure application brightness of the backlight is acceptably high.

The backlight design can include a lightguide that has a component or components that provide the cavity with a balance of specular and diffuse characteristics, the component having sufficient specularity to support significant lateral light transport or mixing, but also having sufficient diffusivity to substantially homogenize the angular distribution of steady state light within the lightguide, even when injecting light only over a narrow range of angles. Additionally, recycling within the lightguide can result in a degree of randomization of reflected light polarization relative to the incident light polarization state. This allows for a mechanism by which unusable polarization light can be converted by recycling into usable polarization light.

The backlight design can include a front reflector that has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized. Additionally, the front reflector has a high value of hemispheric reflectivity, and simultaneously, a sufficiently high value of transmission of application usable light.

The backlight design can include light injection optics that partially collimate or confine light initially injected into the lightguide to propagation directions close to a transverse plane (the transverse plane being parallel to the output area of the backlight), e.g., an injection beam having a full angle-width (about the transverse plane) at half maximum power (FWHM) in a range from 0 to 90 degrees, or 0 to 60 degrees, or 0 to 30 degrees. In some instances it may be desirable for the maximum power of the injection light to have a downward projection, below the transverse plane, at an angle with the transverse plane of no greater than 40 degrees, and in other instances, to have the maximum power of the injected light to have an upwards projection, above the transverse plane towards the front reflector, at an angle with the transverse plane of no greater than 40 degrees.

Backlights incorporating the design features discussed above and disclosed in co-pending PCT Patent Application No. US2008/064115 (Weber), entitled "Recycling Backlights with Semi-specular Components" provide for efficient, uniform, and thin, hollow backlights. Exemplary partial reflectors (front reflectors) can be asymmetric reflective films (ARFs) as described in PCT Patent Application No. US2008/064133 (Weber), entitled "Backlight and Display System Using Same" and provide for low loss reflections and also for better control of transmission and reflection of polarized light than is possible with TIR in a solid light guide alone.

A multilayer interference reflector such as an ESR film can leak light incident to its surface, depending on the medium that the film is immersed in. As the incidence angle increases from the normal to the surface (0 degrees incidence angle) of the multilayer interference reflector, a "leak angle" can be reached. For the purposes of this description, the leak angle is the angle such that most of the light incident on the multilayer interference reflector surface, at or greater than the leak angle, is transmitted through the film. At angles of incidence less than the leak angle, most of the light is reflected from the multilayer interference reflector surface. The leak angle can be dependent on the materials and layer thicknesses in the multilayer interference reflector, the medium in which the multilayer interference reflector is immersed, and the wavelength of the incident light. The leak angle is significantly reduced (i.e. the multilayer interference reflector leaks more incident light) when the refractive index surrounding the multilayer interference reflector is increased. It is to be understood that the two outer surfaces of a multilayer interference reflector can be immersed in different materials having different refractive indices. The leak angle of the reflector can be influenced by each of the different materials; however, if one of the materials is air, light propagating within the multilayer interference reflector and incident to the surface that is immersed in air, undergoes reflection from a surface that has a high relative leak angle. Interactions of light at a material interface with an interference reflector are further discussed, for example, in U.S. Patent Publication No. US2008/0037127 (Weber), entitled "Wide Angle Mirror System".

Reduction in the leak angle of a multilayer interference reflector (by immersion in a higher index material), can adversely affect the brightness and uniformity of a display. For example, when an ESR film comes into optical contact with the lightguide in a backlight, light normally guided within the lightguide at large angles undergoes frustrated total internal reflection (F-TIR), and is optically coupled into the ESR film. This coupling is not particularly detrimental unless another object also comes into optical contact with the other surface of the ESR film in the region of the coupling. The other object can be, for example, part of the display frame, a piece of dust, a liquid, or any other debris. When this occurs, the light optically coupled into the ESR film via F-TIR transmits through the ESR film, and is lost out of the backside of the display. This loss produces dark spots and reduced uniformity in the display.

In some cases, the lightguide and ESR film reflector are separated in the display backlight by an air gap, and a spacer surrounding the lightguide can be used to maintain the air gap. However, the spacer may not always protect the air gap, and debris may enter the space between lightguide and reflector. This debris can cause optical coupling and light leakage, resulting in display dark spots and increased non-uniformity. Moreover, the lightguide and reflector can move independently of each other, and can distort or warp. Warping caused by, for example thermal changes, can cause the reflector and lightguide to contact each other, resulting in light leakage. In some cases, changes in humidity and static electricity can also cause optical coupling and light leakage.

For purposes of this detailed description, a wavelength range of interest can mean visible or near-visible light (e.g., 400-700 nm wavelength), near infrared light (e.g., 700-1000 nm, 700-1400 nm or 700-5000 nm with the selection of one of these ranges sometimes being dependent on the detector or transmission medium employed), or both visible and near infrared light, or portions thereof. Other ranges may also be used as the wavelength range of interest. For example, if the reflective laminate is to be used in a system with a narrow band emitter, such as an LED or a laser, the wavelength range of interest may be relatively narrow (e.g., 100 nm, 50 nm, 10 nm, or less). For reflective laminates used in lighting systems such as backlights for liquid crystal display (LCD) devices or other displays, the wavelength range of interest may be broader (e.g., 400-800 nm, 400-900 nm, 400-1000 nm, 400-1200 nm, 400-1400 nm, 400-1600 nm or 400-1700 nm).

In some cases, alternating materials of suitable refractive index, microlayer thickness profile across the stack, and total number of microlayers can be selected to provide a stack having characteristics such as: a reflection band extending throughout the visible region and extending into the near infrared, having sharp left- and right-band edges, and having a high average reflectivity throughout at least the visible region (and for some applications also throughout the near infrared) of at least 70%, 80%, or 90% or more. Reference is made, for example, to Vikuiti™ Enhanced Specular Reflector (ESR) film sold by 3M Company, which utilizes a birefringent multilayer stack. ESR can have a reflectivity of greater than 98% throughout the visible region.

The film stack can be entirely polymeric, and can be made by a coextrusion process and a stretching process to induce an appropriate amount of birefringence in the microlayers to enhance reflectivity. In some cases, the film stack can include or be limited to inorganic materials, and may be made by vacuum evaporation techniques. Reference is made to U.S. Pat. No. 6,590,707 (Weber) for a birefringent thin film stack that utilizes inorganic materials.

The optically thick adhesive can form a continuous or a discontinuous layer between a substrate and a reflector. In some cases, a continuous layer of the optically thick adhesive can provide uniformity to the display appearance, and improve performance of the backlight. For purposes of this detailed description, "continuous layer" means that the layer covers substantially the entire space between the substrate and the reflector, and "discontinuous layer" means that at least some portion of the space between the substrate and the reflector is not covered by the layer. In some cases, the optically thick adhesive can be made discontinuous, for example by depositing a segmented adhesive pattern on either the substrate or the reflector. In some cases, a uniformly discontinuous adhesive pattern can be used, such as a plurality of adhesive segments uniformly distributed over the substrate and/or reflector. In some cases, the discontinuous coating is discontinuous on a small scale relative to the dimensions of the lightguide, so that artifacts of the adhesive pattern are not visible when the lightguide is being used.

The optically thick adhesive layer can be a continuous layer having protrusions extending from one surface. In one aspect, the optically thick adhesive layer can be a microstructured adhesive that includes protrusions separated regions free of adhesive. The microstructured adhesive can be an array of islands such as dots or other structures, or it can be an array of ridges, or it can be an array of intersecting ridges. The array can be a regular array of protrusions or it can be a random array of protrusions. Examples of microstructured adhesives, and methods of making microstructured adhesives are described in, for example, U.S. Pat. No. 5,650,215 (Mazurek et al.), U.S. Pat. No. 6,123,890 (Mazurek et al.), U.S. Pat. No. 6,315,851 (Mazurek et al.), U.S. Pat. No. 6,440,880 (Mazurek et al.), U.S. Pat. No. 7,250,210 (Mazurek et al.), and U.S. Patent Publication Nos. 2007/0054133 (Sherman et al.), 2007/0054133 (Sherman et al.).

The adhesive material can be an optically clear or an optically diffuse adhesive. An optically diffuse adhesive can provide light scattering from the portion of the reflector that contacts the protrusions, and can re-introduce some of the light which may be lost from the cavity. The optically diffuse adhesive can have particles dispersed within the adhesive to diffuse light, as known in the art. The optically diffuse adhesive can instead be a phase separated adhesive, or an adhesive having microdomains, such as those described in co-pending U.S. Patent Application Ser. No. 60/986,298 entitled, "Optical Adhesive with Diffusive Properties" filed Nov. 8, 2007.

The protrusions contact the reflector in a first portion of the reflector surface. The first portion of the reflector surface is preferably a small portion of the entire surface, such as less than 20%, 10%, 5%, 2%, 1%, or even less than 0.5% of the total reflector surface. The second portion of the reflector surface remains a free surface that is in contact with air, adjacent a void defined between the second portion of the reflector surface, the protrusions, and the substrate. The free surface adjacent the void prevents light leakage through the reflector due to contact with the adhesive.

We turn now to FIG. 1, which shows a backlit display 100 according to one aspect of the disclosure. Backlit display 100 includes a substrate 160, a lightguide assembly 110 affixed to substrate 160 with an optically thick adhesive 150, optional light management films 170, and an LCD module 180.

Lightguide assembly 110 includes a lightguide 120, a light source 122 optically coupled to lightguide 120 with injection optics 124, a back reflector 140 affixed to substrate 160 with optically thick adhesive layer 150, and output element 130. Lightguide 120 can be a solid lightguide, and output element 130 can be an optional partially transmissive front reflector. Lightguide 120 can instead be a hollow cavity lightguide, and output element 130 can be a partially transmissive front reflector, as described elsewhere.

Back reflector 140 is affixed to substrate 160 with optically thick adhesive layer 150. Optically thick adhesive layer 150 includes a plurality of protrusions 152, and voids 154 between protrusions 152. In one embodiment, optically thick adhesive layer 150 covers substrate 160 as a continuous layer as shown in FIG. 1. In another embodiment, optically thick adhesive layer 150 only includes protrusions 152, and there is no adhesive between voids 154 and substrate 160 (not shown in FIG. 1).

A first light ray 125 within lightguide assembly 110 is shown intercepting one of the plurality of protrusions 152 in the contact portion 142 with back reflector 140. A portion 126 of light ray 125 is shown to be lost from lightguide assembly 110 through refraction in contact portion 142. In one embodiment (not shown), the refractive index of optically thick adhesive layer 150 can be lower than the lowest refractive index in back reflector 140, and reflection rather than refraction is more prominent from contact portion 142, and the light is re-directed back into lightguide assembly 110. A second light ray 127 within lightguide assembly 110 is shown intercepting a free surface 144 of back reflector 140 adjacent voids 154. The second light ray 127 within lightguide assembly 110 is shown to reflect by TIR from free surface 144, and remains within lightguide assembly 110.

Optional light management films 170 can further condition the light directed toward LCD module 180, and make more efficient use of the light to improve the brightness and uniformity of backlit display 100. Light leaves lightguide assembly 110, and enters optional light management films 170 before passing through LCD module 180 toward an observer. Optional light management films 170 can include a pair of crossed BEF prism films oriented with the prisms facing LCD module 180. Optional light management films 170 can further include a diffuser and a DBEF reflective polarizer positioned on opposite sides of crossed BEF prism films. Optional diffuser can be positioned between crossed BEF prism films and lightguide assembly 110. In some cases, optional light management films 170 can additionally include other films for further conditioning the light, such as diffusers, filters, and others as known in the art. A portion of the light entering optional light management films 170 passes through toward LCD module 180. Another portion of light entering optional light management films 170 is directed back into lightguide assembly 110 to be recycled.

Figure 2:
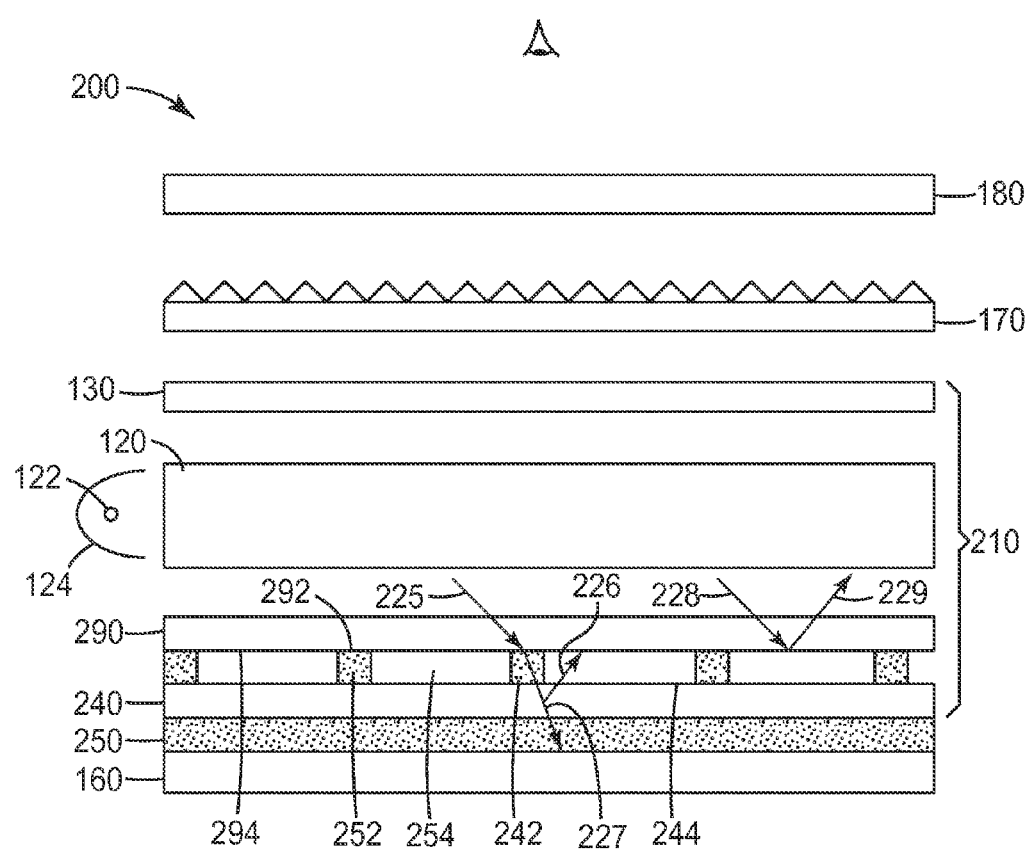
FIG. 2 is a schematic view of backlit display.

FIG. 2 shows a backlit display 200 according to another aspect of the disclosure. The description of like element numbers in FIG. 2 correspond to the description of like element numbers in FIG. 1, above. Backlit display 200 includes a substrate 160, a lightguide assembly 210 affixed to substrate 160 with an optically thick adhesive 250, optional light management films 170 and LCD module 180. Lightguide assembly 210 includes a lightguide 120, a light source 122 optically coupled to lightguide 120 with injection optics 124, a back reflector 240 affixed to substrate 160 with optically thick adhesive layer 250, a diffuser 290 affixed to back reflector 240 with a plurality of adhesive protrusions 252, and output element 130. Lightguide 120 can be a solid lightguide, and output element 130 can be an optional partially transmissive front reflector. Lightguide 120 can instead be a hollow cavity lightguide, and output element 130 can be a partially transmissive front reflector, as described elsewhere.

Back reflector 240 is affixed to substrate 160 with optically thick adhesive layer 250. Optically thick adhesive layer 250 can include a plurality of protrusions (not shown) as described elsewhere, for example as shown by optically thick adhesive layer 150 having protrusions 152 in FIG. 1. Optically thick adhesive layer 250 can instead be a continuous layer in contact with back reflector 240. Diffuser 290 is affixed to back reflector 240 with adhesive protrusions 252. In this way, adhesive protrusions 252 contact back reflector 240 at a contact portion 242 and provide a free back reflector surface 244 adjacent a void 254. Adhesive protrusions 252 also contact diffuser 290 at a contact portion 292 and provide a free diffuser surface 294 adjacent void 254. In one embodiment, diffuser 290 can be a surface diffuser; in another embodiment, diffuser 290 can be a bulk diffuser.

A first light ray 225 within lightguide assembly 210 is shown intercepting one of the plurality of adhesive protrusions 252 in the contact portion 292 with diffuser 290. In the embodiment where the refractive index of adhesive protrusion 252 is lower than the refractive index of diffuser 290, first light ray 225 reflects by TIR (not shown) from contact portion 292. In the embodiment where the refractive index of adhesive protrusion 252 is greater than or equal to the refractive index of diffuser 290, a portion of first light ray 225 is shown to be optically coupled to back reflector 240 through contact portion 242 of adhesive protrusion 252.

Depending on the angle of propagation of first light ray 225, two different paths can be taken after intercepting back reflector 240. An angle near normal incidence with back reflector 240 can cause first light ray 225 to be reflected from back reflector 240 as second light ray 226 and re-enter the lightguide assembly 210. An angle near grazing incidence with back reflector 240 can cause first light ray 225 to leak through back reflector 240, and become lost as third light ray 227 from lightguide assembly 210 through optically thick adhesive layer 250. In the embodiment where optically thick adhesive layer 250 includes protrusions as described with reference to optically thick adhesive layer 150 and protrusions 152 of FIG. 1, the leakage through back reflector 240 can be further minimized or eliminated.

A fourth light ray 228 within lightguide assembly 210 is shown intercepting the free diffuser surface 294 of diffuser 290, adjacent voids 254. Fourth light ray 228 reflects by TIR at free diffuser surface 294, and remains within lightguide assembly 210 as light ray 229.

Figure 3:
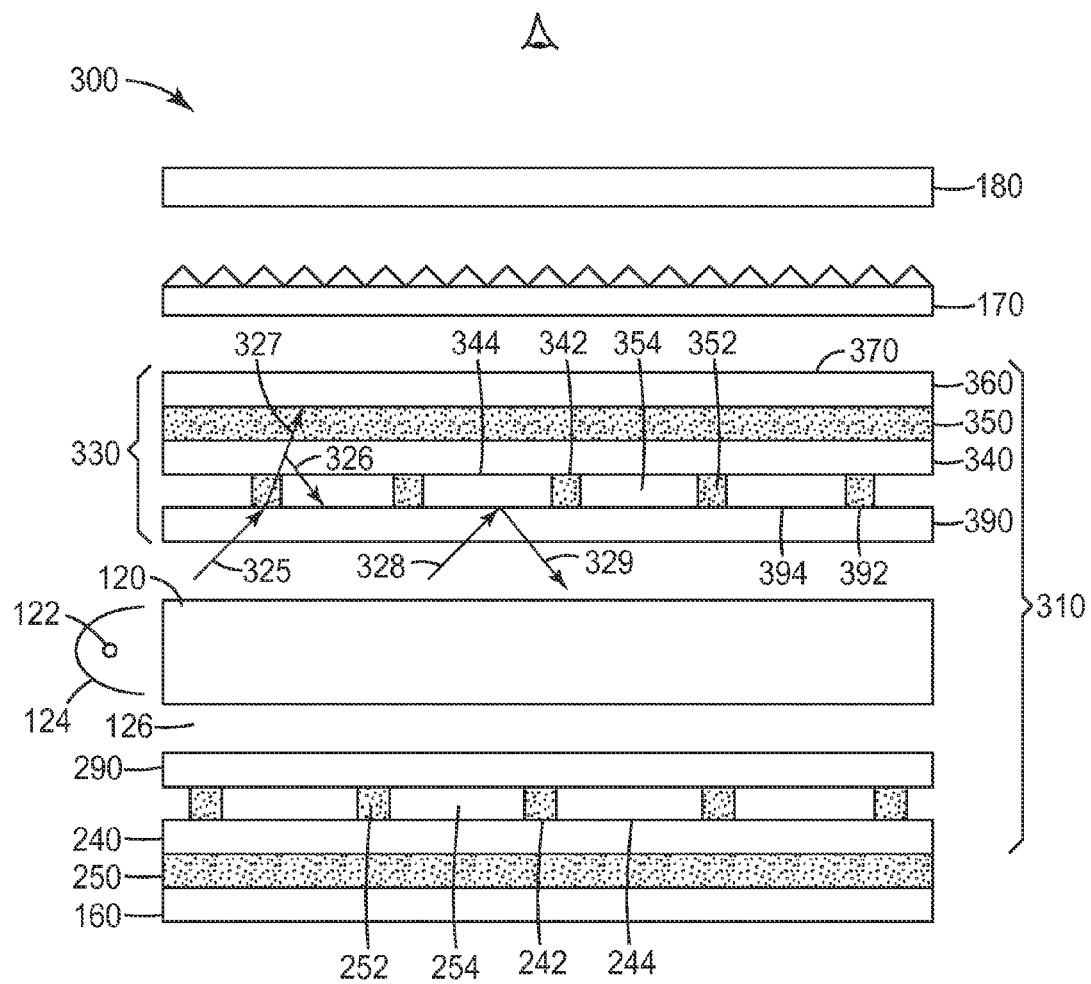
FIG. 3 is a schematic view of backlit display.

FIG. 3 shows a backlit display 300 according to another aspect of the disclosure. The description of like element numbers in FIG. 3 correspond to the description of like element numbers in FIG. 1 and FIG. 2, above. Backlit display 300 includes substrate 160, lightguide assembly 310 attached to substrate 160 with optically thick adhesive layer 250, optional light management films 170 and LCD module 180. In FIG. 3, output element 330 has been expanded to show an embodiment of output element 130 of backlit display 200 as shown in FIG. 2. In FIG. 3 the lightguide 120 is a hollow cavity lightguide, and output element 330 includes a partially transmissive front reflector 340, as described elsewhere.

In FIG. 3, output element 330 includes partially transmissive front reflector 340 which can be an Asymmetric Reflective Film. Partially transmissive front reflector 340 can be adhered to transparent plate 360 with optically thick adhesive layer 350 to support partially transmissive front reflector 340 over the output area 370 of lightguide assembly 310. Optically thick adhesive layer 350 can include protrusions (not shown) as described with reference to optically thick adhesive layer 150 and protrusions 152 in FIG. 1, or it can be a continuous layer as shown in FIG. 3. Diffuser 390 is affixed to partially transmissive front reflector 340 with adhesive protrusions 352. In this way, adhesive protrusions 352 contact partially transmissive front reflector 340 at contact portion 342 and provide a free partially transmissive front reflector surface 344 adjacent voids 354. Adhesive protrusions 352 also contact diffuser 390 at contact portion 392 and provide a free diffuser surface 394 adjacent void 354. In one embodiment, diffuser 390 can be a surface diffuser; in another embodiment, diffuser 390 can be a bulk diffuser. Light rays propagating through diffuser 390 can intercept free diffuser surface 394 at a range of angles ranging from grazing incidence to normal incidence.

A first light ray 325 within lightguide assembly 310 is shown intercepting one of the plurality of adhesive protrusions 352 in the contact portion 392 with diffuser 390. In the embodiment where the refractive index of adhesive protrusion 352 is lower than the refractive index of diffuser 390, first light ray 325 reflects by TIR (not shown) from contact portion 392. In the embodiment where the refractive index of adhesive protrusion 352 is greater than or equal to the refractive index of diffuser 390, a portion of first light ray 325 is shown to be optically coupled to partially transmissive front reflector 340 through refraction at contact portion 342 of adhesive protrusion 352.

Depending on the angle of propagation of first light ray 325, two different paths can be taken after intercepting partially transmissive front reflector 340. An angle near normal incidence with partially transmissive front reflector 340 can cause first light ray 325 to be reflected from partially transmissive front reflector 340 as second light ray 326 and re-enter the lightguide assembly 310. An angle near grazing incidence with partially transmissive front reflector 340 can cause first light ray 325 to leak through partially transmissive front reflector 340, and become lost as third light ray 327 from lightguide assembly 310 through optically thick adhesive layer 350 and transparent plate 360. Third light ray 327 can then proceed through transparent plate 360, light management film 170, and a portion of the light can then pass through LCD module 180 to an observer. In the embodiment where optically thick adhesive layer 350 includes protrusions as described with reference to optically thick adhesive layer 150 of FIG. 1, the leakage through partially transmissive front reflector 340 can be further controlled. A fourth light ray 328 within lightguide assembly 310 is shown intercepting the free diffuser surface 394 of diffuser 390, adjacent voids 354. Fourth light ray 328 reflects by TIR at free diffuser surface 394, and remains within lightguide assembly 310 as light ray 329.

The embodiments described can be used anywhere that a reflector is laminated to a substrate without compromising reflectivity, TIR, or subsequent coupling of light out of a lightguide. For some applications, it may be desirable to adhere the reflective film layer to a surface securely and provide for limited or controlled light leakage. For some other applications, it may be further desirable to redirect light by a combination of scattering and reflection. The embodiments described can be applied anywhere that thin, optically transmissive, or reflective structures are used, including displays such as TV, notebook and monitors, and used for advertising, information display or lighting. The present disclosure is also applicable to electronic devices including laptop computers and handheld devices such as Personal Data Assistants (PDAs), personal gaming devices, cellphones, personal media players, handheld computers and the like, which incorporate optical displays. The backlights of the present disclosure have application in many other areas. For example, backlit LCD systems, luminaires, task lights, light sources, signs and point of purchase displays can be made using the described embodiments.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight assembly, comprising:
   a reflective laminate, comprising:
      a substrate having a first surface, wherein the substrate is a back frame of the backlight;
      an optically thick adhesive layer in contact with the first surface, the optically thick adhesive layer comprising a plurality of protrusions projecting from the first surface;
      a multilayer interference reflector having a second surface disposed facing the first surface, wherein a first portion of the second surface is in contact with the protrusions, and a second portion of the second surface is a free surface adjacent an optically thick void;
      an output element facing the multilayer interference reflector and opposite the substrate, defining a hollow cavity between the output element and the multilayer interference reflector; and
   a light source capable of injecting light into the hollow cavity.

2. The backlight assembly of claim 1, wherein the ratio of the second portion to the first portion is greater than 10.

3. The backlight assembly of claim 1, wherein the output element comprises a partial reflector.

4. The backlight assembly of claim 3, wherein the partial reflector comprises an Asymmetric Reflective Film.

5. The backlight assembly of claim 3, wherein the partial reflector has an input surface and an output surface opposite the input surface, and the output element further comprises:
   an optically transparent plate adhered to the output surface of the partial reflector with a second optically thick adhesive layer;
   a third optically thick adhesive layer in contact with the input surface, the third optically thick adhesive layer comprising a second plurality of protrusions projecting from the input surface; and
   a diffuser in contact with the second plurality of protrusions, wherein the diffuser faces the multilayer interference reflector.

6. The backlight assembly of claim 5, wherein the diffuser is a bulk diffuser.

7. A display, comprising the backlight assembly of claim 1 or claim 5.

* * * * *